US008635592B1

(12) United States Patent
Bodman et al.

(10) Patent No.: US 8,635,592 B1
(45) Date of Patent: Jan. 21, 2014

(54) METHOD AND SYSTEM FOR TAILORING SOFTWARE FUNCTIONALITY

(75) Inventors: Mark David Bodman, Austin, TX (US); Gary I. Brown, Austin, TX (US); Mikal Grimes, Austin, TX (US); Ramon Renteria, Pflugerville, TX (US); James Edward Van Riper, Austin, TX (US)

(73) Assignee: Troux Technologies, Inc., Austin, TX (US)

( * ) Notice: Subject to any disclaimer, the term of this patent is extended or adjusted under 35 U.S.C. 154(b) by 313 days.

(21) Appl. No.: 13/022,778

(22) Filed: Feb. 8, 2011

(51) Int. Cl.
*G06F 9/44* (2006.01)

(52) U.S. Cl.
USPC ........... 717/110; 717/111; 717/113; 717/106; 717/107; 717/108

(58) Field of Classification Search
USPC .......... 717/110, 111, 113, 106, 107, 108, 109
See application file for complete search history.

(56) References Cited

U.S. PATENT DOCUMENTS 5,572,732 A 11/1996 Fant
5,845,068 A 12/1998 Winiger
5,968,176 A 10/1999 Nessett et al.
6,226,792 B1 5/2001 Goiffon
6,292,900 B1 9/2001 Ngo et al.
6,442,557 B1 8/2002 Buteau
6,509,898 B2 1/2003 Chi
6,529,909 B1 3/2003 Bowman-Amuah
6,611,838 B1 8/2003 Ignat
6,662,188 B1 12/2003 Rasmussen
7,080,077 B2 7/2006 Ramamurthy et al.
7,103,171 B1 9/2006 Annadata
7,124,180 B1 10/2006 Ranous
7,231,661 B1 6/2007 Villavicencio et al.
7,409,707 B2 8/2008 Swander et al.
7,428,546 B2 9/2008 Nori
7,480,798 B2 1/2009 Haugh
7,512,965 B1 3/2009 Amdur et al.
7,523,128 B1 4/2009 Miller et al.
7,533,173 B2 5/2009 Badovinatz et al.
7,558,790 B1 7/2009 Miller et al.
7,603,547 B2 10/2009 Patrick et al.
7,644,432 B2 1/2010 Patrick et al.
7,664,712 B1 2/2010 Duvall et al.
7,669,051 B2 2/2010 Redlich et al.
7,698,683 B1 4/2010 Miller et al.
7,757,277 B2 7/2010 Haugh
7,822,710 B1 10/2010 Miller et al.
7,890,545 B1 2/2011 Cason, Jr. et al.
8,027,956 B1 9/2011 Van Riper et al.
8,086,615 B2 12/2011 Patrick et al.

(Continued)

OTHER PUBLICATIONS

Notice of Allowance for U.S. Appl. No. 11/117,039, mailed Mar. 27, 2012, 15 pgs.

(Continued)

*Primary Examiner* — Qamrun Nahar
(74) *Attorney, Agent, or Firm* — Sprinkle IP Law Group

(57) ABSTRACT

Systems and methods for tailoring the functionality of software applications are disclosed. Specifically, embodiments of the present invention may tailor the functionality of a software application by tailoring the features of the interfaces of the software application presented to a user based on one or more maturity levels of the user. In this manner, the set of features, and thus the functionality or complexity of a software application, may be tailored to the maturity levels of a user.

21 Claims, 17 Drawing Sheets

(56) References Cited

U.S. PATENT DOCUMENTS

| | | | | |
|---|---|---|---|---|
| 8,214,877 | B1 | 7/2012 | Grimes et al. | |
| 8,234,223 | B1 | 7/2012 | Maginniss | |
| 2003/0009487 | A1 | 1/2003 | Prabakaran et al. | |
| 2003/0088551 | A1 | 5/2003 | Tong | |
| 2003/0110253 | A1 | 6/2003 | Anuszczyk | |
| 2003/0177481 | A1 | 9/2003 | Amaru | |
| 2003/0187826 | A1 | 10/2003 | Kennedy et al. | |
| 2003/0208367 | A1 | 11/2003 | Aizenbud-Reshef | |
| 2003/0212640 | A1 | 11/2003 | Andresen | |
| 2004/0002818 | A1 | 1/2004 | Kulp | |
| 2004/0049509 | A1 | 3/2004 | Keller | |
| 2004/0059943 | A1 | 3/2004 | Marquet et al. | |
| 2004/0073655 | A1 | 4/2004 | Kan | |
| 2004/0111513 | A1 | 6/2004 | Shen | |
| 2004/0225791 | A1 | 11/2004 | Keskar | |
| 2004/0243835 | A1 | 12/2004 | Terzis et al. | |
| 2004/0260706 | A1 | 12/2004 | Anonsen et al. | |
| 2005/0033762 | A1 | 2/2005 | Kasravi | |
| 2005/0138039 | A1 * | 6/2005 | Hagen | 707/100 |
| 2005/0203920 | A1 | 9/2005 | Deng | |
| 2006/0085837 | A1 | 4/2006 | Pesati et al. | |
| 2006/0106796 | A1 | 5/2006 | Venkataraman | |
| 2006/0136437 | A1 | 6/2006 | Yamasaki | |
| 2006/0167927 | A1 | 7/2006 | Edelstein | |
| 2006/0195460 | A1 | 8/2006 | Nori | |
| 2006/0195575 | A1 | 8/2006 | Delany et al. | |
| 2006/0212487 | A1 | 9/2006 | Kennis et al. | |
| 2006/0253709 | A1 | 11/2006 | Cheng et al. | |
| 2006/0277022 | A1 | 12/2006 | Pulfer | |
| 2006/0294148 | A1 | 12/2006 | Brunet | |
| 2007/0143604 | A1 | 6/2007 | Arroyo et al. | |
| 2007/0180490 | A1 | 8/2007 | Renzi et al. | |
| 2007/0192415 | A1 | 8/2007 | Pak | |
| 2007/0255841 | A1 | 11/2007 | Chong | |
| 2007/0282916 | A1 | 12/2007 | Albahari et al. | |
| 2008/0120362 | A1 | 5/2008 | Kapoor et al. | |
| 2010/0169380 | A1 | 7/2010 | Miller et al. | |

OTHER PUBLICATIONS

Maloney, David, "E-manufacturing e'zing into factories: the potential is great for using the Internet to aid Manufacturing. Supply chain visibility, the wired plant, trading exchanges and data sharing are at the forefront," Moder Material Handling, v 57, n6, p. 21 (3), May 15, 2002 from Dialog.

Office Action issued in U.S. Appl. No. 10/803,133, mailed Oct. 4, 2006, 9 pages.

Office Action issued in U.S. Appl. No. 10/803,133, mailed May 17, 2007, 11 pages.

Office Action issued in U.S. Appl. No. 10/802,304, mailed Jun. 18, 2007, 9 pages.

Muller, Robert, Database Design for Smarties Using UML for Data Modeling, Morgan Kaufmann Publishers, 1999, 265 pages.

Office Action issued in U.S. Appl. No. 11/095,323, mailed Aug. 10, 2007, 12 pages.

Office Action issued in U.S. Appl. No. 10/802,178, mailed Sep. 5, 2007, 11 pages.

Office Action issued in U.S. Appl. No. 10/803,133, mailed Nov. 2, 2007, 10 pages.

Office Action issued in U.S. Appl. No. 10/802,034, mailed Jan. 9, 2008, 11 pages.

Office Action issued in U.S. Appl. No. 10/802,178, mailed Mar. 3, 2008, 10 pages.

Office Action issued in U.S. Appl. No. 11/095,323, mailed Mar. 3, 2008, 16 pages.

Office Action issued in U.S. Appl. No. 11/198,649, mailed Apr. 29, 2008, 10 pages.

Office Action issued in U.S. Appl. No. 10/803,133, mailed May 28, 2008, 12 pages.

Office Action issued in U.S. Appl. No. 10/802,304, mailed Jun. 30, 2008, 14 pages.

Office Action issued in U.S. Appl. No. 10/802,178, mailed Aug. 19, 2008, 9 pages.

Office Action issued in U.S. Appl. No. 11/095,323, mailed Aug. 20, 2008, 13 pages.

Office Action issued in U.S. Appl. No. 11/117,039, mailed Aug. 20, 2008, 19 pages.

Office Action issued in U.S. Appl. No. 10/803,133, mailed Oct. 7, 2008, 14 pages.

Office Action issued in U.S. Appl. No. 11/117,039, mailed Feb. 12, 2009, 27 pages.

Office Action issued in U.S. Appl. No. 10/802,304, mailed Feb. 17, 2009, 12 pages.

Office Action issued in U.S. Appl. No. 11/095,323, mailed Feb. 17, 2009, 14 pages.

Office Action issued in U.S. Appl. No. 11/198,649, mailed Feb. 27, 2009, 11 pages.

Office Action issued in U.S. Appl. No. 10/802,304, mailed Aug. 4, 2009, 9 pages.

Gornik, "UML Data Modeling Profile", May 2002, Rational corp., TP162, pp. i-ii, 1-11.

Cbop et al., "A UML Profile for Enterprise Distributed Object Computing—Joint Final Submission—Component Collaboration Archicatures (CCA)", Feb. 2002, OMG Document No. ad/2001-08-19, http://enterprisecomponent.com/docs/EdocCCA.pdf, 169 pages.

Office Action issued in U.S. Appl. No. 11/117,039, mailed Aug. 17, 2009, 26 pages.

Office Action issued in U.S. Appl. No. 11/095,323, mailed Aug. 28, 2009, 15 pages.

Office Action issued in U.S. Appl. No. 11/805,873, mailed Sep. 11, 2009, 9 pages.

Office Action issued in U.S. Appl. No. 11/095,323, mailed Mar. 1, 2010, 21 pages.

Office Action issued in U.S. Appl. No. 11/117,039, mailed Mar. 15, 2010, 28 pages.

Office issued Action issued in U.S. Appl. No. 11/805,873, mailed Mar. 15, 2010, 10 pages.

Office Action issued U.S. Appl. No. 11/929,157, mailed Jun. 6, 2010, 13 pages.

Du et al., XML structures for relational data, Web Information Systems Engineering, 2001. Proceedings of the Second International Conference on (0-7965-1393-X), Dec. 3-6, 2001, vol. 1; p. 151-160. download: http://ieeexplore.ieee.org/stamp/stamp.jsp?isnumber+21506&arnumber=996476&punumber=7824.

Notice of Allowance issued in U.S. Appl. No. 11/805,873, mailed Aug. 31, 2010, 6 pages.

Office issued in Action issued in U.S. Appl. No. 11/929,157, mailed Nov. 24, 2010, 12 pages.

Office issued Action issued in U.S. Appl. No. 11/805,002, mailed Feb. 2, 2011, 12 pages.

Notice of Allowance issued in U.S. Appl. No. 11/929,157, mailed May 23, 2011, 17 pages.

Office Action for U.S. Appl. No. 11/805,002, mailed Jul. 20, 2011, 18 pgs.

Office Action for U.S. Appl. No. 12/720,219, mailed Aug. 14, 2012, 9 pgs.

Notice of Allowance for U.S. Appl. No. 11/805,002, mailed Mar. 2, 2012, 16 pgs.

* cited by examiner

```
- <configuration>
  - <group name="widgetUI">
    - <list name="layouts">
      - <group name="APOTabbed-general" replace="true">
        - <group name="layoutConfig" replace="true">
            <setting name="labelColumnWidth" value="0%"/>
          - <list name="propertyBoxes" replace="true">
            - <group name="Basic" replace="true">
                <setting name="boxLabel" value="Application"/>
                <setting name="renderWhen" value= "${atMaturityLevel('apo','level1')}"/>
              </group>
            - <group name="Owner" replace="true">
                <setting name="boxLabel" value="Business Owner"/>
                <setting name="renderWhen" value="${atMaturityLevel('apo','level1')}"/> <
              /group>
            - <group name="OwnershipAndCost" replace="true">
                <setting name="boxLabel" value="Costs"/>
710             <setting name="renderWhen" value="${atMaturityLevel('apo','level3')}"/>
              </group>
            - <group name="Risks" replace="true">
                <setting name="boxLabel" value="Risk"/>
                <setting name="renderWhen" value="${atMaturityLevel('apo','level1')}"/>
              </group>
            - <group name="Users" replace="true">
                <setting name="boxLabel" value="Other Relationships"/>
                <setting name="renderWhen" value="${atMaturityLevel('apo','level1')}"/> <
              /group>
            - <group name="Consumers" replace="true">
                <setting name="boxLabel" value="Consumers"/>
                <setting name="renderWhen" value="${atMaturityLevel('apo','level2')}"/> <
              /group>
            - <group name="AppFunctions" replace="true">
                <setting name="boxLabel" value="Application Functions"/>
                <setting name="renderWhen" value="${atMaturityLevel('apo','level3')}"/> <
              /group>
            - <group name="RelatedArtifacts" replace="true">
                <setting name="boxLabel" value="Related Artifacts"/>
                <setting name="renderWhen" value="${atMaturityLevel('apo','level1')}"/> <
              /group>
            - <group name="RecommendedDisposition" replace="true">
                <setting name="boxLabel" value="Recommended Disposition"/>
                <setting name="renderWhen" value="false"/>
              </group>
            </list>
          </group>
          <setting name="layoutType" value="APOTabbed-general"/>
```

*FIG. 6A*

```
      <setting name="layoutURL" value="/widgets/boxedTwoColumnLayout.jsp"/>
      <setting name="objectType" value="CompType_TRM:Application_UUID"/>
     </group>
    </list>
  </group>
</configuration
```

*FIG. 6B*

```
- <configuration>
  - <group name="widgetUI">
    - <list name="layouts">
      - <group name="APOTabbed-general" replace="true">
          <setting name="layoutType" value="APOTabbed-general"/>
          <setting name="layoutURL"
          value="/widgets/boxedTwoColumnLayout.jsp"/> <setting
          name="objectType" value= "CompType_TRM:Application_UUID"/>
      - <group name="layoutConfig" replace="true">
            <setting name="labelColumnWidth" value="0%"/>
          - <list name="propertyBoxes" replace="true">
            - <group name="Basic" replace="true">
                <setting name="boxLabel" value="Application"/>
                <setting name="boxType" value="fieldset"/>
                <setting name="renderWhen" value="${atMaturityLevel('apo','level1')}"/>
              - <list name="properties" replace="true">
                - <group name="PropDef_TRM:Application_GenInfo_Installed_UUID"
                  replace="true">
                    <setting name="label" value="Installation Date"/>
                    <setting name="mode" value="${ITOwnerMode}"/>
                  </group>
                - <group name="PropDef_TRM:Application_GenInfo_RetirementTarget_UUID"
                  replace="true">
                    <setting name="label" value="Target Retirement Date"/>
                    <setting name="mode" value="${ITOwnerMode}"/>
                  </group>
                </list>
              </group>
            - <group name="Owner" replace="true">
                <setting name="boxLabel" value="Business Owner"/>
                <setting name="boxType" value="fieldset"/>
                <setting name= "renderWhen" value="${atMaturityLevel('apo','level1')}"/>
              - <list name="properties" replace="true">
                - <group name
                  ="Reltype_application_component_has_business_owner_is_business_owner
                  _of_person" replace="true">
                    <setting name="labelPosition" value="none"/>
                    <setting name="mode" value="${ITOwnerMode}"/>
                    <setting name="widget" value="singleComponent"/>
                  - <group name="widgetConfig" replace="true">
                      <setting name="allowCreate" value="true"/>
                      <setting name="allowDeleteComponent" value="true"/>
                      <setting name="allowDeleteRelationship" value="true"/>
                      <setting name="componentEditorPopupURL" value="/do/widget
                      /editObjectPopup?layoutType=APO2LayoutPopup"/>
                      <setting name="drillthroughUR L" value="/do/widget
                      /editComponent?layoutType=APO2Layout&mode=view"/>
                      <setting name="relationshipEditorPopupURL" value="/do/widget
```

*FIG. 7A*

```
/editObjectPopup?layoutType=APO2LayoutPopup"/>
- <list name="properties" replace="true">
  - <group name="name" replace="true">
      <setting name="label" value="Owner"/>
      <setting name="mode" value="view"/>
      <setting name="width" value="40%"/>
    </group>
  - <group name="PropDef_TRM:Person_officePhoneNumber_UUID"
    replace="true">
      <setting name="label" value="Phone"/>
      <setting name="mode" value="view"/>
      <setting name="width" value="30%"/>
    </group>
  - <group name="PropDef_TRM:Person_emailAddress_UUID" replace="true">
      <setting name="label" value="Email"/>
      <setting name="mode" value="view"/>
      <setting name="width" value="30%"/>
    </group>
  </list>
</group>
</group>
</list>
</group>
- <group name="OwnershipAndCost" replace="true">
  <setting name="boxLabel" value="Costs"/>
  <setting name="boxType" value="fieldset"/>
  <setting name="renderWhen" value="${atMaturityLevel('apo','level3')}"/>
  - <list name="properties" replace="true">
    - <group name="PropDef_TRM:ApplicationDomain_recurringCost_UUID"
      replace="true">
      <setting name="label" value="Recurring Cost"/>
      <setting name="mode" value="${ITOwnerMode}"/>
    - <group name="widgetConfig" replace="true">
        <setting name="precision" value="2"/>
        <setting name="styleWidth" value="90px"/>
      </group>
    </group>
  - <group name="PropDef_TRM:ApplicationDomain_recurringCostInterval_UUID"
    replace="true">
      <setting name="label" value="Recurring Cost Interval"/>
      <setting name="mode" value="${ITOwnerMode}"/>
    </group>
  - <group name="PropDef_ITG:Application_initalDeploymentCost_UUID" replace="true">
      <setting name="label" value="Initial Deployment Cost"/>
      <setting name="mode" value="${ITOwnerMode}"/>
  - <group name="widgetConfig" replace="true">
        <setting name="precision" value="2"/>
        <setting name="styleWidth" value= "90px"/>
      </group>
    </group>
  - <group name="PropDef_ITG :Application_annualSoftwareCosts_UUID" replace="true">
      <setting name="label" value="Annual Software Costs"/>
```

FROM FIG. 7B

810

```
      <setting name="mode" value="${ITOwnerMode}"/>
    - <group name="widgetConfig" replace="true">
        <setting name="precision" value="2"/>
        <setting name="styleWidth" value="90px"/>
      </group>
    </group>
  - <group name="PropDef_ITG:Application_annualHardwareCosts_UUID" replace="true">
      <setting name="label" value="Annual Hardware Costs"/>
      <setting name="mode" value="${ITOwnerMode}"/>
    - <group name="widgetConfig" replace="true">
        <setting name="precision" value="2"/>
        <setting name="styleWidth" value="90px"/>
      </group>
    </group>
  - <group name="PropDef_ITG:Application_annualInternalStaffCosts_UUID"
    replace="true">
      <setting name="label" value="Annual Internal Staff Costs"/>
      <setting name="mode" value="${ITOwnerMode}"/>
    - <group name="widgetConfig" replace="true">
        <setting name="precision" value="2"/>
        <setting name="styleWidth" value="90px"/>
      </group>
    </group>
  - <group name="PropDef_ITG:Application_annualExternalStaffCosts_UUID"
    replace="true">
      <setting name="label" value="Annual External Staff Costs"/>
      <setting name="mode" value="${ITOwnerMode}"/>
    - <group name="widgetConfig" replace="true">
        <setting name="precision" value="2"/>
        <setting name="styleWidth" value="90px"/>
      </group>
    </group>
  - <group name="PropDef_ITG:Application_annualOtherCosts_UUID" replace="true">
      <setting name="label" value="Annual Other Costs"/>
      <setting name="mode" value="${ITOwnerMode}"/>
    - <group name="widgetConfig" replace="true">
        <setting name="precision" value="2"/>
        <setting name="styleWidth" value="90px"/>
      </group>
    </group>
   </list>
  </group>
- <group name="Risks" replace="true">
    <setting name="boxLabel" value="Risk"/>
    <setting name="boxType" value="fieldset"/>
    <setting name="renderWhen" value="${atMaturityLevel('apo','level1)}"/>
  - <list name="properties" replace="true">
    - <group
      name="Reltype_disaster_recovery_plan_applies_to_has_application_component_
      UUID:1" replace="true">
        <setting name="label" value="DR Plan"/>
        <setting name="mode" value="${ITOwnerMode}"/>
```

*FIG. 7C*

```
            <setting name="widget" value="singleComponent"/>
          - <group name="widgetConfig" replace="true">
              <setting name="allowCreate" value="true"/>
              <setting name="allowDeleteComponent" value="true"/>
              <setting name="allowDeleteRelationship" value="true"/>
              <setting name="componentEditorPopupURL" value="/do/widget
              /editObjectPopup?layoutType=APO2LayoutPopup"/>
              <setting name="drillthroughURL" value="/do/widget
              /editComponent?layoutType=APO2Layout&mode=view"/>
              <setting name="relationshipEditorPopupURL" value="/do/widget
              /editObjectPopup?layoutType=APO2LayoutPopup"/>
            </group>
          </group>
        </list>
      </group>
    - <group name="Users" replace="true">
        <setting name="boxLabel" value="Other Relationships"/>
        <setting name="boxType" value="none"/>
        <setting name="renderWhen" value=${atMaturityLevel('apo','level1')}"/>
      - <list name="properties" replace="true">
        - <group name="PropDef_TRM:Application_GenInfo_Accounts_UUID" replace="true">
            <setting name="label" value="Number of User Accounts"/>
            <setting name="mode" value="${ITOwnerMode}"/>
          </group>
        - <group name="multiProperty" replace="true">
            <setting name="label" value="Number of Sessions"/>
          - <group name="widgetConfig" replace="true">
            - <list name="properties" replace="true">
              - <group name="PropDef_TRM:Application_GenInfo_Sessions_UUID"
                replace="true">
                  <setting name="afterText" value="in"/>
                  <setting name="label" value="Number of Sessions"/>
                  <setting name="labelvalign" value="top"/>
                  <setting name="mode" value="${ITOwnerMode}"/>
                </group>
              - <group name="PropDef_TRM:Application_GenInfo_DayRange_UUID"
                replace="true">
                  <setting name="afterText" value="day(s)"/>
                  <setting name="label" value="Duration"/>
                  <setting name="labelvalign" value="top"/>
                  <setting name="mode" value="${ITOwnerMode}"/>
                </group>
              </list>
            </group>
          </group>
        - <group name="PropDef_TRM:Application_GenInfo_LoginDate_UUID" replace="true">
            <setting name="label" value="Last Login Date"/>
            <setting name="mode" value="${ITOwnerMode}"/>
          </group>
        </list>
      </group>
    - <group name="Consumers" replace="true">
```

*FIG. 7D*

```
  <setting name="boxLabel" value="Consumers"/>
  <setting name="boxType" value="fieldset"/>
  <setting name="renderWhen" value="${atMaturityLevel('apo','level2')}"/>
- <list name="properties" replace="true">
  - <group name="RelType_ITG:Application_supports_Organization_UUID"
    replace="true">
        <setting name="label" value="Supports User Departments"/>
        <setting name="labelPosition" value="above"/>
        <setting name="mode" value="${ITOwnerMode}"/>
        <setting name="renderWhen" value="${atMaturityLevel('apo','level2')}"/>
    - <group name="widgetConfig" replace="true">
          <setting name="allowCreate" value="true"/>
          <setting name="allowDeleteComponent" value="true"/>
          <setting name="allowDeleteRelationship" value="true"/>
          <setting name="componentEditorPopupURL" value="/do/widget
          /editObjectPopup?layoutType=APO2LayoutPopup"/>
          <setting name="componentType"
          value="CompType_ITG:Internal_Organization_UUID"/>
          <setting name="drillthroughURL" value="/do/widget
          /editComponent?layoutType=APO2Layout&mode=view"/>
          <setting name="pickerURL" value="/?selD=A32A030E-F521-4C5E-
          8DAF-2FFC9F4D1F8A"/>
          <setting name="relationshipEditorPopupURL" value="/do/widget
          /editObjectPopup?layoutType=APO2LayoutPopup"/>
      - <list name="properties" replace="true">
        - <group name="name" replace="true">
              <setting name="mode" value="view"/>
              <setting name="width" value="60%"/>
          </group>
        - <group name="PropDef_ITG:supports_impactRating_UUID" replace="true">
              <setting name="isRelationshipProperty" value="true"/>
              <setting name="width" value="40%"/>
          </group>
        </list>
      </group>
    </group>
  - <group name="RelType_EnablesAction_UUID:0" replace="true">
        <setting name="label" value="Supports Business Functions"/>
        <setting name="labelPosition" value="above"/>
        <setting name="mode" value="${ITOwnerMode}"/>
        <setting name="renderWhen" value="${atMaturityLevel('apo','level3')}"/>
    - <group name="widgetConfig" replace="true">
          <setting name="allowCreate" value="true"/>
          <setting name="allowDeleteComponent" value="true"/>
          <setting name="allowDeleteRelationship" value="true"/>
          <setting name= "componentEditorPopupURL" value="/do/widget
          /editObjectPopup?layoutType=APO2LayoutPopup"/>
          <setting name="componentType" value="Business Function"/>
          <setting name="drillthroughURL" value="/do/widget
          /editComponent?layoutType=APO2Layout&mode=view"/>
          <setting name="relationshipEditorPopupURL" value="/do/widget
          /editObjectPopup?layoutType=APO2LayoutPopup"/>
```

*FIG. 7E*

```
        - <list name="properties" replace="true">
          - <group name="name" replace="true">
              <setting name="mode" value="view"/>
              <setting name="width" value="60%"/>
            </group>
          - <group name="PropDef_ITG:provides_is_provided_by_impactRating_UUID"
            replace="true">
              <setting name=" isRelationshipProperty" value="true"/>
              <setting name="width" value="40%"/>
            </group>
          </list>
        </group>
      </group>
    - <group
      name="Reltype_deployed_software_is_located_in_is_location_of_location_UUID:0"
      replace="true">
        <setting name="labelPosition" value="above"/>
        <setting name="renderWhen" value="${atMaturityLevel('apo','level3')}"/>
        <setting name="widget" value="componentList"/>
      - <group name="widgetConfig" replace="true">
          <setting name="allowCreate" value="true"/>
          <setting name="allowDeleteComponent" value="true"/>
          <setting name="componentEditorPopupURL" value="/do/widget
          /editObjectPopup?layoutType=APO2LayoutPopup"/>
          <setting name="componentType" value="CompType_TRM:Location_UUID"/>
          <setting name="drillthroughURL" value="/do/widget
          /editComponent?layoutType=APO2Layout&mode=view"/>
          <setting name="relationshipEditorPopupURL" value="/do/widget
          /editObjectPopup?layoutType=APO2LayoutPopup"/>
        </group>
      </group>
    </list>
  </group>
- <group name="AppFunctions" replace="true">
    <setting name="boxLabel" value="Application Functions"/>
    <setting name= "boxType" value="fieldset"/>
    <setting name="renderWhen" value="${atMaturityLevel('apo','level3')}"/>
  - <list name="properties" replace="true">
    - <group name= "RelType_EnablesAction_UUID:0" replace="true">
        <setting name="label" value="Application Provides Functions"/>
        <setting name="labelPosition" value="above"/>
        <setting name="mode" value="${ITOwnerMode}"/>
      - <group name="widgetConfig" replace="true">
          <setting name="allowCreate" value="true"/>
          <setting name="allowDeleteComponent" value="true"/>
          <setting name="allowDeleteRelationship" value="true"/>
          <setting name="componentEditorPopupURL" value="/do/widget
          /editObjectPopup?layoutType=APO2LayoutPopup"/>
          <setting name="componentType" value="Application Function"/>
          <setting name=" drillthroughURL" value="/do/widget
          /editComponent?layoutType=APO2Layout&mode=view"/>
          <setting name="relationshipEditorPopupURL" value="/do/widget
```

FIG. 7F

```
              /editObjectPopup?layoutType=APO2LayoutPopup"/>
            </group>
          </group>
        </list>
      </group>
    - <group name="RelatedArtifacts" replace="true">
        <setting name="boxLabel" value="Related Artifacts"/>
        <setting name="boxType" value="fieldset"/>
        <setting name="renderWhen" value="${atMaturityLevel('apo','level1')}"/>
      - <list name="properties" replace="true">
        - <group name="PropDef_ITG:Application_relatedArtifacts_UUID" replace="true">
            <setting name="labelPosition" value="none"/>
            <setting name="mode" value="${ITOwnerMode}"/>
          </group>
        </list>
      </group>
    - <group name="RecommendedDisposition" replace="true">
        <setting name="boxLabel" value="Recommended Disposition"/>
        <setting name="boxType" value="fieldset"/>
        <setting name="renderWhen" value="false"/>
      - <list name="properties" replace="true">
        - <group name="PropDef_TRM:Application_recommendation_UUID" replace
          ="true">
            <setting name="mode" value="${editMode(isPortfolioPlanner||isAdministrator)}
          "/>
          </group>
        - <group name="PropDef_TRM:Application_recommendationDate_UUID" replace
          ="true">
            <setting name="mode" value="
            ${editMode(isPortfolioPlanner||isAdministrator)}"/>
          </group>
        - <group name="PropDef_TRM:Application_recommendationComments_UUID"
          replace="true">
            <setting name="labelvalign" value="top"/>
            <setting name="mode"value="${editMode(isPortfolioPlanner||isAdministrator)}
           "/>
          </group>
        </list>
      </group>
    </list>
  </group>
 </group>
</list>
</group>
</configuration>
```

FIG. 7G

```
- <configuration>
  - <group name="widgetUI">
    - <list name="layouts">
      - <group name="APOTabbed" replace="true">
        - <group name="layoutConfig" replace="true">
            <setting name="headerLayoutType" value="APOTabbed-header"/>
          - <list name="tabs" replace="true">
            - <group name="generalTab" replace="true">
                <setting name="label" value="General"/>
                <setting name="layoutType" value="APOTabbed-general"/>
              </group>
          - <group name="technicalTab" replace="true">
                <setting name="label" value="Technical"/>
                <setting name="layoutType" value="APOTabbed-technical"/>
910             <setting name="renderWhen" value="${atMaturityLevel('apo','level2')}"/>
              </group>
          - <group name="lifecyclesTab" replace="true">
                <setting name="label" value="Lifecycles"/>
                <setting name="layoutType" value="APOTabbed-lifecycles"/>
                <setting name="renderWhen" value="${atMaturityLevel('apo','level2')}"/>
              </group>
          - <group name="applicationsTab" replace="true">
                <setting name="label" value="Applications"/>
                <setting name="layoutType" value="APOTabbed-applications"/>
                <setting name="renderWhen" value="false"/>
              </group>
          - <group name="modulesTab" replace="true">
                <setting name="label" value="Modules"/>
                <setting name="layoutType" value="APOTabbed-modules"/>
                <setting name="renderWhen" value="${atMaturityLevel('apo','level3')}"/>
              </group>
          - <group name="historyTab" replace="true">
                <setting name="label" value="History"/>
                <setting name="layoutType" value="widgetTabbed-history"/>
                <setting name="lazyLoadTab" value="true"/>
              </group>
          - <group name="reviewsTab" replace="true">
                <setting name="label" value="Reviews"/>
                <setting name="layoutType" value="APOTabbed-reviews"/>
              </group>
            </list>
          </group>
          <setting name="layoutType" value="APO2Layout"/>
          <setting name="layoutURL" value="/widgets/tabbedLayout.jsp"/>
          <setting name="objectType" value="CompType_TRM:Application_UUID"/>
        </group>
```

*FIG. 8A*

</list>
</group>
</configuration>

FIG. 8B

METHOD AND SYSTEM FOR TAILORING SOFTWARE FUNCTIONALITY

TECHNICAL FIELD

This disclosure relates in general to enterprise software systems, and more particularly, to tailoring software functionality to the abilities of users or user populations.

BACKGROUND

The world is comprised of a wide and varied assortment of environments and subsystems. Akin to the proverbial butterfly flapping its wings in China and causing a hurricane over Texas, miniscule changes to one part of an environment may have catastrophic ripple effects in a distant part of the same environment. One particular example of such an environment is an enterprise environment where these enterprise environments may include an information technology (IT) environment. These IT environments may be intended to have a wide variety of uses: disseminating information about goods and services offered through a site on the World Wide Web, storing internal information related to a business, providing a programming infrastructure for development of software, or keeping track of sales and sales force information.

Consequently, these IT environments grow organically, sewn together in a Frankenstinian manner from a variety of heterogeneous machines and applications. As may be imagined these IT environments may be quite complex. In particular, the adoption of large enterprise software systems such as those intended for sales force automation, enterprise resource planning, supply chain management, strategic IT planning, etc. may require not just the installation of the software and training but often dramatic shifts in culture, how people do their job, what their jobs are and how success is measured with respect to those jobs. Accordingly, in many cases adopting or altering software in an enterprise environment requires the establishment of a new practice or program which impacts large segments of the enterprise's human resources.

It is often impossible, however, to "flip a switch" and have hundreds, thousands or tens of thousands of employees embrace and internalize new practices associated with that enterprise software or to become fully versed with such software instantaneously. What usually occurs is that for a few people, using such software becomes their job while the remaining majority of employees may only utilize the software occasionally to support them in their job. Thus, while those few employees for whom using the enterprise software is their job will quickly grow acclimatized to, and familiar with, the functionality provided by that software, the remaining majority of employees will not obtain fluency with the software and, indeed, may not either desire or require the use of some functionality. In fact, to these employees the presentation of this additional functionality may prove a hindrance to the use of the software as it may prove daunting or confusing.

What is desired, then, is the ability to tailor the functionality presented to a user of a software application according to the needs and abilities of broad and diverse user populations such that the functionality of a software application can be tailored to the maturity of various users within an organization or according to the maturity of the programs or practices supported by that software.

SUMMARY

Systems and methods for tailoring the functionality of software applications are disclosed. Specifically, embodiments of the present invention may tailor the functionality of a software application by tailoring the features of the interfaces of the software application presented to a user based on one or more maturity levels of the user. In particular, in certain embodiments a user of a software application may be classified with respect to a set of maturity sequences. Each interface of the software application may comprise a set of features and these features may be associated with a feature rule that defines whether the associated feature is to be presented to the user in the interface based upon an evaluation of the user's classification with respect to one or more of the maturity sequences. In this manner, the set of features, and thus the functionality or complexity of a software application, may be tailored to the maturity levels of users.

In one embodiment the maturity levels may correspond to a capability and maturity model. Thus the features of the interfaces of a software application may similarly be segmented according to the maturity levels of a capability and maturity model through the use of the feature rule associated with a feature. A user may be classified as a particular maturity level for each of a number of maturity sequences according to a number of criteria associated with each maturity sequence and the interfaces presented to the user specifically tailored for the user's maturity utilizing any maturity sequence desired.

Advantageously then, users that are similar may be presented with similar functionality based on the maturity level of the user. This allows the features of the application to be tailored to particular groups of users within an organization with a fine level of granularity. Furthermore, the features presented to a user or group of users may be substantially automatically tailored to those users with little involvement of the administrator by changing the feature rules, maturity sequences, etc.

In one particular embodiment, a method may comprise determining that a user is accessing an interface of a set of interfaces for a software application, each interface comprising a set of features. A set of maturity sequences associated with the software application may used to classifying the user into one of a set of maturity levels for each of the set of maturity sequences. The set of features of the interface and a feature rule associated with each of the set of features of the interface may be determined, where each feature rule comprises an expression associated with a maturity sequence and one of the set of maturity levels. For each of the set of features it can be determined if the feature should be included in the interface based on the feature rule associated with the feature, the maturity sequence associated with the feature rule and the maturity level into which the user has been classified for the maturity sequence associated with the feature rule. If it is determined that a feature should be included, including the feature in the interface assembled and presented to the user.

Embodiments may thus be utilized with an enterprise software system (referred to also as an application manager) to "tune" the content and capabilities of the enterprise software system to match the maturity (e.g. needs, education, commitment or capabilities) of groups of users in the enterprise. An administrator can "turn a dial" to increase or decrease the amount of data that must or may be provided by the users in conjunction with the user of these interfaces. For example, at the lowest level an application steward may see only the application name and description while at the highest level there may be scores of properties to be filled out.

Accordingly, embodiments may support the systematic rollout of functionality or demands on the users as they are ready to assume them. Embodiments allow an administrator to scale how the enterprise software system presents to different groups adopting the software and systematically manage the adoption. As an adopter group matures in its execution of a use case the content will automatically scale to match the maturity allowing an administrator to decompose the organization to create a systematic adoption roadmap by use case and adoption group.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 6A-6B (collectively FIG. 6) include one embodiment of XML that defines a portion of an interface.

FIGS. 7A-7G (collectively FIG. 7) include one embodiment of XML that defines a portion of an interface.

FIGS. 8A-8B (collectively FIG. 8) include one embodiment of XML that defines a portion of an interface.

DETAILED DESCRIPTION

Figure 1:
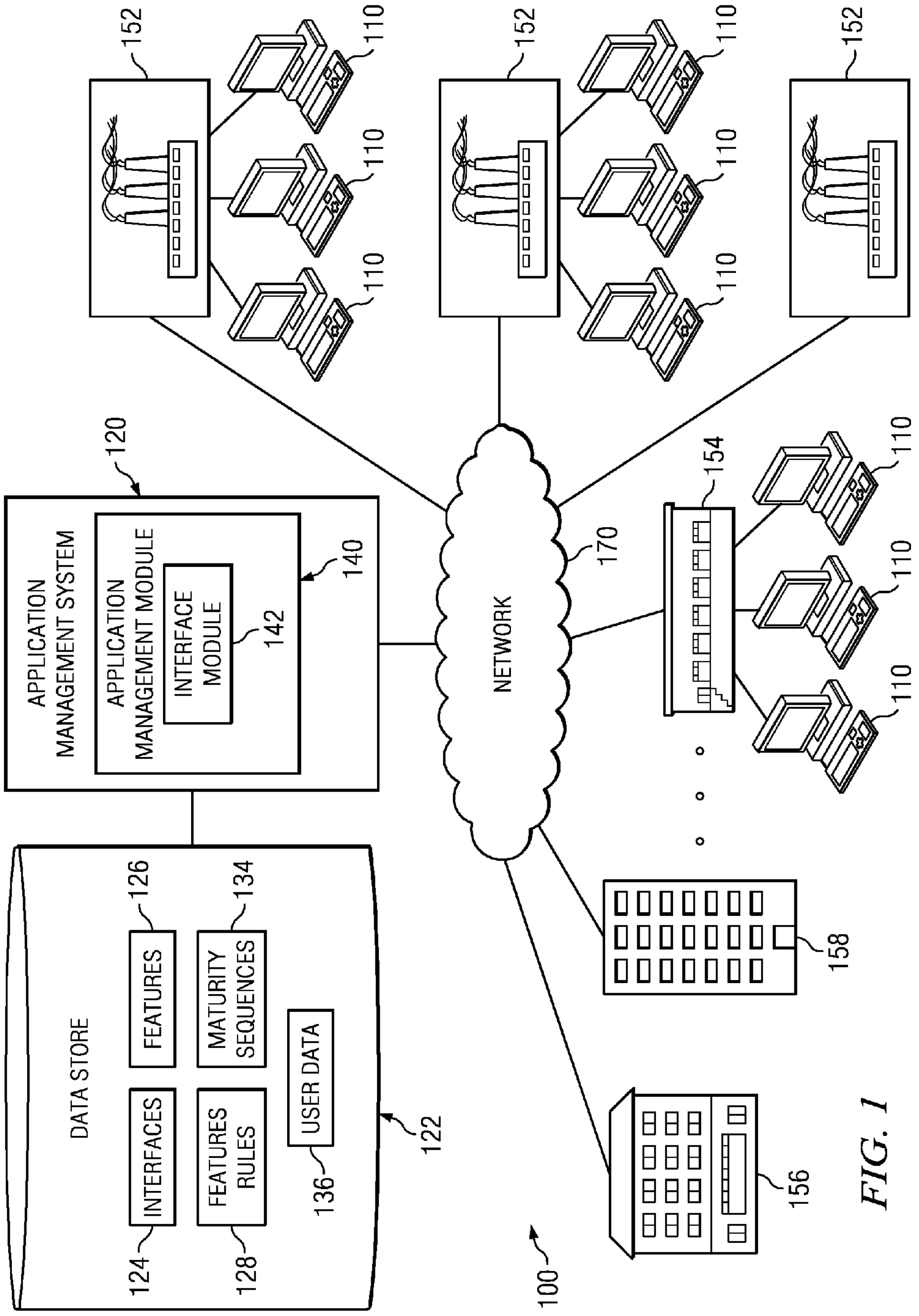
FIG. 1 includes an example of an enterprise environment comprising an application management system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments are described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.", "in one embodiment."

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. For example, though embodiments of the present invention may be presented in conjunction with a particular software application (e.g. an application manager such as the Troux Optimization Engine) it should be understood that other embodiments may be utilized with other examples of software applications, whether discussed explicitly herein or not.

As mentioned above, there may be a wide variety of needs, desires, commitment levels, or capabilities with respect to users of a software application deployed in an enterprise environment. Thus, effective utilization or adoption of such software application may be hindered. While certain solutions to this problem have been implemented, most of these solutions have been deficient in adapting to the maturity level of an organization or the maturity levels of groups or individual users within the organization. What is desired, then, is the ability to tailor the functionality presented to a user of a software application according to the needs and abilities of broad and diverse user populations such that the functionality of a software application can be tailored to the maturity of various users within an organization or according to the maturity of the programs or practices supported by the software.

To that end, among others, attention is now directed to the systems and methods of embodiments of the present invention. Specifically, embodiments of the present invention may tailor the functionality of a software application by tailoring the features of the interfaces of the software application presented to a user based on one or more maturity levels of the user. In particular, a user of a software application may be classified with respect to a set of maturity sequences. Each interface of the software application may comprise a set of features and these features may be associated with a feature rule that defines whether the associated feature is to be presented to the user in the interface based upon an evaluation of the user's classification with respect to one or more of the maturity sequences. In this manner, the set of features, and thus the functionality or complexity of a software application, may be tailored to the maturity levels of a user.

In certain embodiments, then, for each maturity sequence a user may be classified according to a level of a capability and maturity model. Thus the features of the interfaces of a software application may similarly be segmented according to the maturity levels of a capability and maturity model through the use of the feature rule associated with a feature. A user may be classified as a particular maturity level for each of a number of maturity sequences according to a number of criteria associated with each maturity sequence and the interfaces presented to the user specifically tailored for the user's maturity utilizing any maturity sequence desired.

Advantageously then, users that are similar may be presented with similar functionality based on the maturity level of the user. This allows the features of the application to be tailored to particular groups of users within an organization with a fine level of granularity. Furthermore, the features presented to a user or group of users may be substantially automatically tailored to those users with little involvement of the administrator by changing the feature rules, maturity sequences, etc.

Embodiments of the systems and methods of the present invention may be better explained with reference to FIG. 1 which depicts one embodiment of a topology in which embodiments of the systems and methods of the present invention may be employed. Enterprise environment 100 may comprise an organization such as a company or governmental organization, including all of its subsidiaries, systems or users. As may be imagined, such an enterprise environment 100 may include things as physical resources including for example, factories 152, distribution centers (not shown), warehouses 156, offices 158, retail outlets (not shown), computers 110, etc.; human resources including employees of the enterprise; and the enterprise's non-physical resources such as software applications, databases, etc. It will be noted that the resources (physical, human, non-physical) of an enterprise may be in different locales (e.g. the factory may be in a different city than the corporate headquarters which may in a different city than a distributor) but may be grouped across the different locales according to various criteria (for example, users in multiple locations may be associated with the sales group of the enterprise).

As may be imagined, the management of such complex enterprises may be present a challenge. This is especially the case when it comes to managing the software applications that are deployed in the enterprise environment 100. Such software applications may be deployed across locations and computing devices of the enterprise and may be utilized by a wide variety of users of the enterprise who reside in multiple locations. These users may utilize different functionality of these software applications for different purposes and each user may have a different level of knowledge, experience, motivation, desire, etc. when it comes to use of that application.

One example, of such an application is an application manager (also referred to as the Troux Optimization application or the Application Portfolio Optimization application). Such an application manager may allow a user to manage or optimize the portfolio of applications that are deployed across the enterprise. More specifically, such an application manager may serve to manage the people, processes, data or technology associated with the software applications deployed in the enterprise.

Accordingly, an application management system 120 for implementation of such an application manager may be provided in the enterprise 100. The application management system 120 may comprise an application management module 140 configured to manage or otherwise optimize the software applications (or deployment thereof) across the enterprise 100. The application management system 120 may be coupled to other computing devices of the enterprise 100 through, for example, network 170 (which may be a LAN, WAN, intranet, the Internet, some combination of networks, etc.) such that the application management system 120 may be accessed from multiple locations within the enterprise 100. It will be noted here that the application management system 120 has been depicted separately from the remainder of the enterprise 100 only for purposes of discussion and that such an application management system 120 may comprise one or more computing devices that may, or may not be, located at one or more of the locations where portions of the enterprise 100 reside.

Application management system 120 may also comprise data store 122. Data store 122 may include interfaces 124 for use with the application management system 120 where an interface may comprise one or more of features 126. These interfaces 124 may include one or more administrator interfaces with which an administrator may configure the application manager system 120, for example, by configuring maturity sequences or feature rules as will be discussed. In one embodiment, these interfaces may be XML files that define the features of the interface.

Features 126 include such things as form fields, tabs, fields, sections, actions on objects, reports, or any other portion of an interface that may be presented to, or used to interact with, a user. The data store 122 may also include user data 136, feature rules 128 and maturity sequences 134. A maturity sequence 134 may comprise a classification rule that classifies a user based on a set of values for user data associated with that user to determine a maturity level associated with that sequence for a user. A feature rule 128 may comprise an expression for evaluation using one or more of the maturity sequences. Each of the features 126 may be associated with one or more feature rules 128.

Application management module 140 may comprise an interface module 142 configured to present a user of the application management module with interfaces based on the data in data store 122 such that user can access the functionality of the application management module. These interfaces may for example, be browser based interfaces that may be navigated by a user accessing the application management system 120. Application interface module 142 may determine that a user is accessing a particular interface 124 and determine the set of features 126 associated with the interface 124 being accessed by a user. The application interface module 142 may then obtain user data associated with the user. This user data may be stored in data store 122, obtained from the user directly, or obtained from another source altogether. Using this user data, then, the user can be classified according to the maturity sequences 134 to determine a maturity level for each of the maturity sequences for the user. The feature rules 128 for the set of features comprising the particular interface 124 may then be evaluated using the maturity level (s) determined for the maturity sequences to determine which features are to be presented to the user in the enterprise. Once the set of features to be presented in the interface is determined, the interface comprising those features may be rendered and presented to the user.

Specifically, in one embodiment the application interface module 142 may access a set of XML files that define the interface being accessed and the classifications for the user for each maturity sequence. The XML files for the interface may define the set of features of an interface and any feature rule(s) that are to be associated with a feature. Based on the feature rules associated with the features in the XML file and the classifications for the user in the maturity sequence(s) the application interface module 142 may render the interface such that the interface includes the appropriate features.

It may be helpful now to go into more detail regarding embodiments of the systems and methods that may be employed in conjunction with an application management system to tailor the interfaces of an application manager to particular users or groups of users. The embodiments of the systems and methods presented may be usefully employed with embodiments of an application manager as discussed above. Such an application manager may serve, at least in part, to optimize the set of software applications deployed across an enterprise with respect to a particular goal or combination of goals. These goals may include, for example, minimization of cost, minimization of non-standard modules, maximization of standard modules, minimization of cost to retire, minimize risk or a wide variety of other goals.

An application manager may be part of an enterprise software suite designed to support an enterprise-wide or division-level strategic IT planning and enterprise architecture (SITP/EA) program. An SITP/EA program drives to create complementary business, capability, process and IT infrastructure architectures along with plans to evolve those architectures to match the future needs and market challenges of the organization. Application managers provide tools and analytics to enable architects, decision makers and business analysts to optimize applications, contracts and IT infrastructure with the needs of the business. By its nature then, an SITP/EA program may affect and be used by the majority of an IT organization along with some business users. Most of these workers have primary duties beyond SITP/EA and so are casual, intermittent and uncommitted users.

As such an application manager may present a wide variety of functionality, a wide variety of interfaces may be utilized and each of those interfaces may potentially have a large number of features. As may be imagined, not all users of such an application manager desire, or require, all the features of a particular interface. In some cases, the presentation of a large number of features to those users who are not yet equipped to deal with those features may result in less than optimal usage of the system, frustration on the user's part and in general, slow adoption of the application manager across the enterprise. Conversely, however, some users may desire or require all features of the interfaces. By presenting a less rich feature set to these types of users, the functionality of the application manager may be artificially curtailed. Thus, as discussed above, it is desired to tailor the interface of such an application manager to the particular user.

However, in many cases it may be difficult to ascertain which features the user may desire, require or even be capable of utilizing with any degree of effectiveness, or which features may serve to frustrate a user and curtail his use of such an application manager. To help ascertain which features to present to a particular user then, in certain embodiments, the user may be classified according to one of a set of maturity levels for each of a number of maturity sequences, where each maturity sequence is associated with a category of maturity, based on user data. It should be noted here that while one set of maturity levels may be utilized in conjunction with all maturity sequences it may also be the case that different sets of maturity levels may be utilized for different maturity sequences, or some combination. Thus, for example, a user may be classified according to a first set of maturity levels for a first maturity sequence and be classified according to a second set of maturity levels for a second maturity sequence.

The maturity levels assigned to the user for each of the maturity sequences may describe a continuum of maturity levels according to a Capability and Maturity Model (CMM). The CMM was originally developed as a tool for objectively assessing the ability of government contractors' processes to perform a contracted software project. The CMM is based on the process maturity framework first described in the 1989 book *Managing the Software Process* by Watts Humphrey. It was later published in a report in 1993 (Technical Report CMU/SEI-93-TR-024 ESC-TR-93-177 February 1993, Capability Maturity Model SM for Software, Version 1.1) and as a book by the same authors in 1995, all of which are hereby incorporated by reference in their entirety.

Though the CMM comes from the field of software development, it is used as a general model to aid in improving organizational business processes in diverse areas; for example in software engineering, system engineering, project management, software maintenance, risk management, system acquisition, information technology (IT), services, business processes generally, human capital management, etc. The CMM has been used extensively worldwide in government, commerce, industry and software development organizations.

Figure 2:
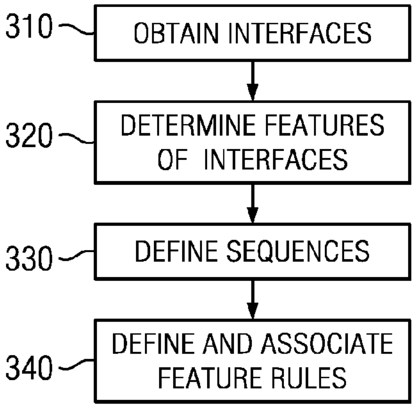
FIG. 2 includes one embodiment of a method for use in tailoring interfaces of a software application.

FIG. 2 depicts one embodiment of a method for defining the presentation of interfaces of an application manager that may be employed in conjunction with embodiments of an application manager. At step 310 a set of interfaces that may be presented to a user by an application manager may be obtained. These interfaces may comprise a form that defines the layout of a set of features that are to be presented to a user. In one embodiment, an interface may comprise a set of eXtensible Markup Language (XML) files that define the features of an interface, such that the XML file can be processed to render the interface that comprises the features. There may, for example, be one XML file that defines a particular type of feature for a particular interface. Thus, there may be an XML file for tabs, an XML file for sections, an XML file for reports, etc.

The interfaces can then be evaluated to determine the set of features associated with each of the interfaces at step 320. For example, by processing each of the XML files comprising an interface. Next at step 330 maturity sequences can be defined. In one embodiment, the maturity sequences may correlate with the modules of the application manager such that the features of interfaces corresponding to a module may be determined with reference to the maturity sequence corresponding to that module.

To define a maturity sequence, the maturity sequence may be given a name, such as "apo", "designPatterns", "standards," that will serve to identify the sequence. These names may correlate to a module of the application manager to which the maturity sequence corresponds. For example, a maturity sequence named "apo" may correlate to an Application Platform Optimization module of the application manager. The sequence can then be further defined by defining the classification rules by which a user will be classified into one of a set of maturity levels based on the on one or more criteria. In one embodiment, the criteria may be a default criteria such that all users are classified at a particular maturity level for the sequence substantially regardless of user data associated with the user. For example, a default level may be assigned such that any user will be classified as maturity level "level3" for a particular sequence without regard to any user data associated with the user.

Alternatively, there may be a classification algorithm that serves to classify a user into one of the maturity levels based on user data associated with a user. This user data may include such data as an organization within the enterprise the user belongs to, years of employment, the user's position within the enterprise, the applications utilized by a user or almost any other user data that may be obtained about a user within a particular enterprise. It will be understood that as different enterprises may keep or obtain different data about employees or other users of the application management system the user data that may be utilized in embodiments of scoring algorithms may be different depending on the enterprise in which embodiments as discussed herein are deployed. For example, in one embodiment, a scoring algorithm may dictate that if an user data indicates that the user is in the organization "IT" the user may classified as maturity level "level4", if the user data indicates the user is in the organization "Support" the user may be classified as maturity level "level3", if the user data indicates that the user is in the organization "Legal" the user may be classified as maturity level "level2" while if the user data indicates that the user is in the organization "Sales" the user may be classified as maturity level "level1."

Other methods of establishing a user's maturity level for a maturity sequence may be used. For example, all users may be set to the same maturity level, the maturity level for a maturity sequence may be scheduled (e.g. rise) according to a calendar schedule for all, or a subset of, users (e.g. the change can be set to happen on a specific future date, and the system will automatically raise the maturity level on that day). The maturity level may be established based on the user's membership in an organizational unit within an enterprise, for example a division or department. The maturity level is based on a user's responsibility for a group of objects. Within, for example, the context of an application manager that could mean that a user is responsible for maintaining information about specific groups of applications. The applications could be grouped based on their importance, cost, or support for certain business processes, among many other examples. Any combination of the criteria above or other criteria may also be used to establish such maturity levels.

At step 340 feature rules may be defined and associated with one or more features. These feature rules may determine which features are presented to a user in a particular interface based on the maturity level into which the user has been classified with respect to one or more of the maturity sequence. More specifically, in one embodiment, one or more features of an interface as defined by the XML corresponding to the interface may be associated with a feature rule which is an expression for evaluating the maturity levels associated with at least one maturity sequence. For example, a feature rule may specify that if the user is at a particular maturity level for a particular maturity sequence (or above that maturity level, below that maturity level, etc.) the associated feature will be displayed to the user when that interface is presented to the user.

In one embodiment, the feature rule for a feature of the interface may be contained in the XML file of the interface that comprises the definition of that feature. The features to be presented in conjunction with that interface can then be determined based on the feature rules in the XML file(s) and the maturity level(s) into which the user has been classified in the maturity sequence(s), as will now be discussed in more detail.

Figure 3:
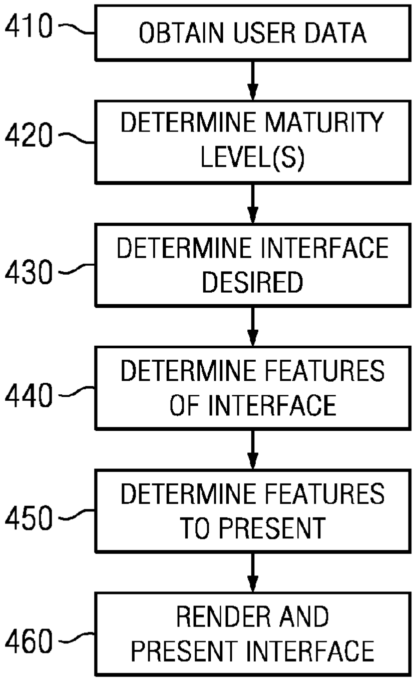
FIG. 3 includes one embodiment of a method for use in tailoring interfaces of a software application.

Moving to FIG. 3 then, one embodiment of a method for tailoring an interface is depicted. A user who wishes to utilize the application manager application may access the application manager system. At step 410 data on the user is obtained. In particular, in one embodiment, the user may be required to login to utilize the application manager application. Based on the login information, a set of user data associated with the user may be obtained. This user data may be obtained from a data store comprising information on the user associated with his role in the enterprise. This user data may include his location, organization or group, years of employment, employee identification number, etc.

The user may then be classified into one of a set of maturity levels for each of one or more maturity sequences at step 420. As noted above, it may be the case that a user is classified as a default maturity level for a maturity sequence regardless of the user data associated with the user. Alternatively, a user may be classified as a maturity level for a maturity sequence based on a classification algorithm associated with the maturity sequence that takes into account values for particular user data, as detailed above. At this step then, for each maturity sequence the user is either classified into a default level for a maturity sequence or the classification algorithm is applied based on the values associated with that user for the particular criteria used by the classification algorithm. In any event, at the end of the step that user has been classified into one of a set of maturity levels for each maturity sequence.

The interface desired by the user may then be determined at step 430. As the interface may be a browser based interface, this interface desired may be determined utilizing a Universal Resource Locator (URL) accessed by the user. At least a portion of the interface may comprise a XML files that may be utilized to assemble the interface to be presented to the user. The XML files may reference the full set of features that may be presented in an interface assembled and presented to a user. An interface may also comprise data objects that may be utilized to assemble the interface to be presented to the user. Thus, interfaces may be defined utilizing, XML, objects in a data store or some combination of both XML and of objects in a data store.

Using this form, at step 440, the features of the interface may be determined. These features may comprise, for example, fields, menus, actions on objects, navigation options, section reports, or almost any other aspects of, or data that may be presented through, an interface. It can then be determined at step 450 which of the set of features to present to the user in conjunction with the presentation of the desired interface to this user.

As discussed above, one or more of the features of the desired interface may be associated with a feature rule. Each feature rule may be an expression for evaluating the maturity levels associated with at least one maturity sequence. In one embodiment, the feature rules may be Boolean expressions that may comprise terms associated with one or more maturity sequences and corresponding maturity levels for those sequences. For example, a feature rule may specify that if the user is at a particular maturity level for a particular maturity sequence (or above that maturity level, below that maturity level, etc.) the associated feature will be displayed to the user when that interface is presented to the user. Multiple maturity sequences may also be used in a feature rule. For example, a feature rule may specify that if a user is at a first maturity level for a first maturity sequence and at a second maturity level for a second maturity level for a second maturity sequence the associated feature will be displayed to the user when that interface is presented to the user.

In one embodiment, the feature rules may be in the XML file that describe the desired interface. The XML files may be structured such that a feature described in one of the XML files is associated with the feature rule corresponding to that feature. In some embodiments there may be multiple XML files for the feature rules for a particular interface, where each XML file may correspond to one or more types of features comprising the full set of features of the interface. For example, there may be an XML file corresponding to sections of the interface, tabs of the interface, fields of the interface, etc.

Thus, once the set (one or more) XML files comprising the features any feature rules associated with the features of the desired interface can be obtained. For each of the set of features with an associated feature rule specified in the XML files for the interface it can then be determined if that feature is to be presented in the interface. In particular, the feature rule for a feature may be determined from the XML file and the feature rule evaluated using the maturity levels associated with the user for the maturity sequence(s) referenced by that feature rule. Thus, at the end of this step, a set of features which may be all of, or some subset of, the full set of features for the desired interface, to be presented to the user in the interface has been determined.

Accordingly, at step 460, the interface may be rendered using the determined set of features and the interface presented to the user. These steps may be repeated for each interface of the application manager program accessed by the user. Thus, the interfaces presented to the user during his interaction with the application manager program may be tailored to the maturity level of the user, enhancing the user's experience with the application manager.

It may be helpful here to go over specific examples of interfaces, features, maturity sequences, maturity levels and feature rules to give a better understanding of embodiments discussed herein. These examples should in no way be construed as limiting the embodiments.

Figure 4:
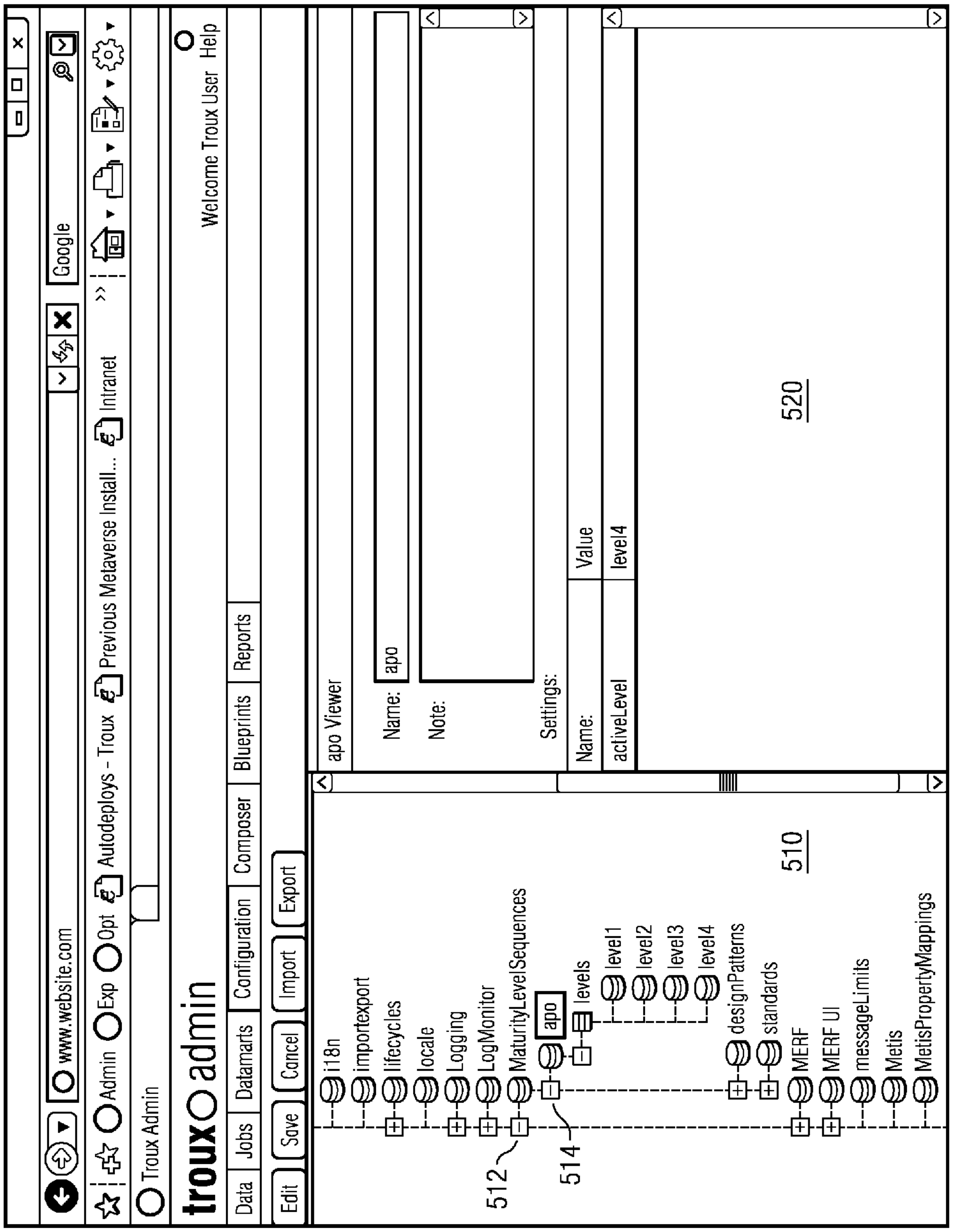
FIG. 4 includes one embodiment of an interface.

Referring first to FIG. 4, one embodiment of an interface that may be utilized by an administrator of an application manager program to define a maturity sequence and the associated maturity levels for that maturity sequence is depicted. This administrator interface include a menu 510 that presents the administrator with the ability to select or add to, a set of maturity sequences, referred to "maturityLevelSequences" 512. Maturity sequences presented in the menu 510 are "apo", "designPAtterns" and "standards." By selecting a maturity sequence, in this case "apo" 514 the set of maturity levels are presented to the administrator, in this case the set of maturity levels associated with the maturity sequence "apo" 514 are "level1", "level2", "level3" and "level4."

Additionally, by selecting a maturity sequence, data associated with the maturity sequence selected may be presented in section 520 of the interface. This section may present the name of the maturity sequence selected along with the ability to define a classification rule for the maturity sequence or the ability to assign a default maturity level for the maturity sequence. In the embodiment depicted, the user has assigned the default level ("activeLevel") for the maturity sequence "apo" to the maturity level "level4".

Figure 5:
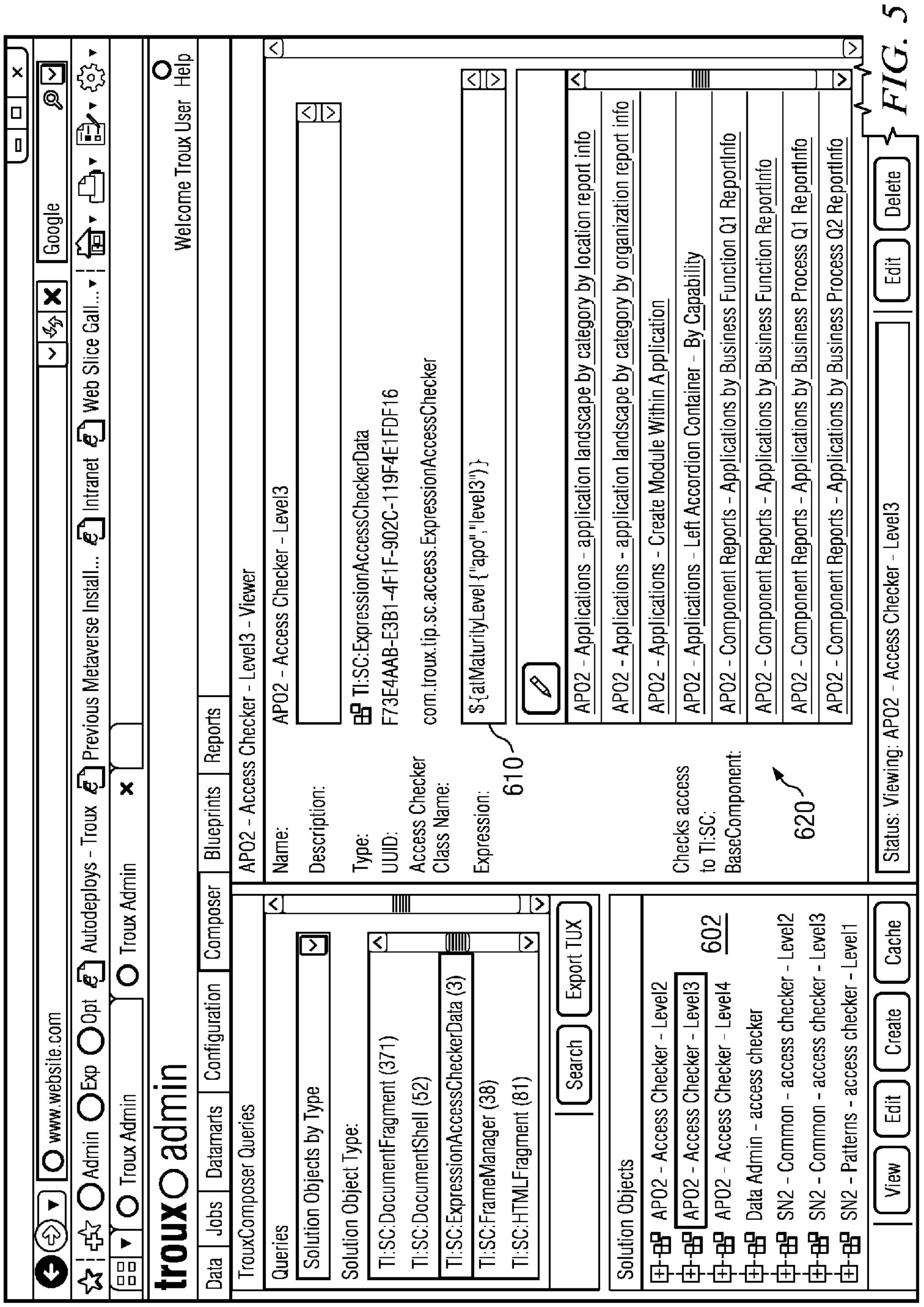
FIG. 5 includes one embodiment of an interface.

Moving to FIG. 5, one embodiment of an interface for use by an administrative user to associate a feature rule with a feature of an interface is depicted. This administrator interface may present a menu corresponding to a user interface selected using menu 602 from which the administrative user can define a feature rule 610 and a corresponding set of features 620 of the interface, such that when the interface is selected by a user, the user will be presented with the set of features 620 only if the maturity level for the maturity sequence is as defined by the feature rule 610. Here, the feature rule 610 is an expression designating that the maturity level for the maturity sequence "apo" must be at "level3" for the features 620 to be presented to the user in conjunction with the interface. These features 620 include, for example, reports shown in context menus, actions, such as "Create Module within Application," and certain navigation sections for example the "By Capability" accordion pane.

The feature rules defined by such an interface may be saved in association with the feature(s) to which they correspond in the XML file for the interface which comprises the feature such that the feature rule corresponding to a feature in an interface may be identified.

FIGS. 6-8 depict embodiments of such XML files which define an interface, including the features of the interface and feature rules associated with one or more of the features. FIG. 6 depicts one embodiment of an XML file that comprise the sections of an interface, FIG. 7 depicts one embodiment of an XML file that comprise the fields of the sections of the same interface as described in FIG. 6 and FIG. 8 depicts the XML file that comprises the tabs of the same interface described in FIG. 7 and FIG. 8. Thus, when the interface corresponding to FIGS. 6-8 is rendered, these XML files may be obtained and the features (e.g. sections, fields, tabs) defined in these XML files will be displayed in the rendered interface. As discussed above, certain of the features may have a feature rule associated with them such that the feature will only be rendered in the interface if the feature rule is satisfied.

For example, with reference first to FIG. 6, XML 710 defines a section of interface that is displayed as a section labeled "Costs." Notice that the XML 710 comprises the code "<setting name="renderWhen" value="${atMaturityLevel ('apo','level3')}" " defining a feature rule which indicates denoting that the "Costs" section of the interface is to be rendered only when the maturity level of a user is "level3" or higher.

Referring now to FIG. 7, XML 810 defines fields of the section of the interface labeled "Costs" described with respect to FIG. 6 and which displays certain costs such as "Recurring Cost," "Recurring Cost Interval," "Initial Deployment Cost," etc. Notice that the XML 810 comprises the code "<setting name="renderWhen" value="${atMaturityLevel ('apo','level3')}" " defining a feature rule which indicates that the "Costs" section and thus the fields described are to be rendered only when the maturity level of a user is "level3" or higher.

FIG. 8 defines the tabs of the interface. For example, XML 910 comprises the code "<setting name="renderWhen" value="${atMaturityLevel('apo','level3')}" defining a feature rule which indicates that the "Lifecycle" tab of the interface is to be rendered only when the maturity level of a user determined for the according to the maturity sequence 'apo' is "level2" or higher.

Figure 9:
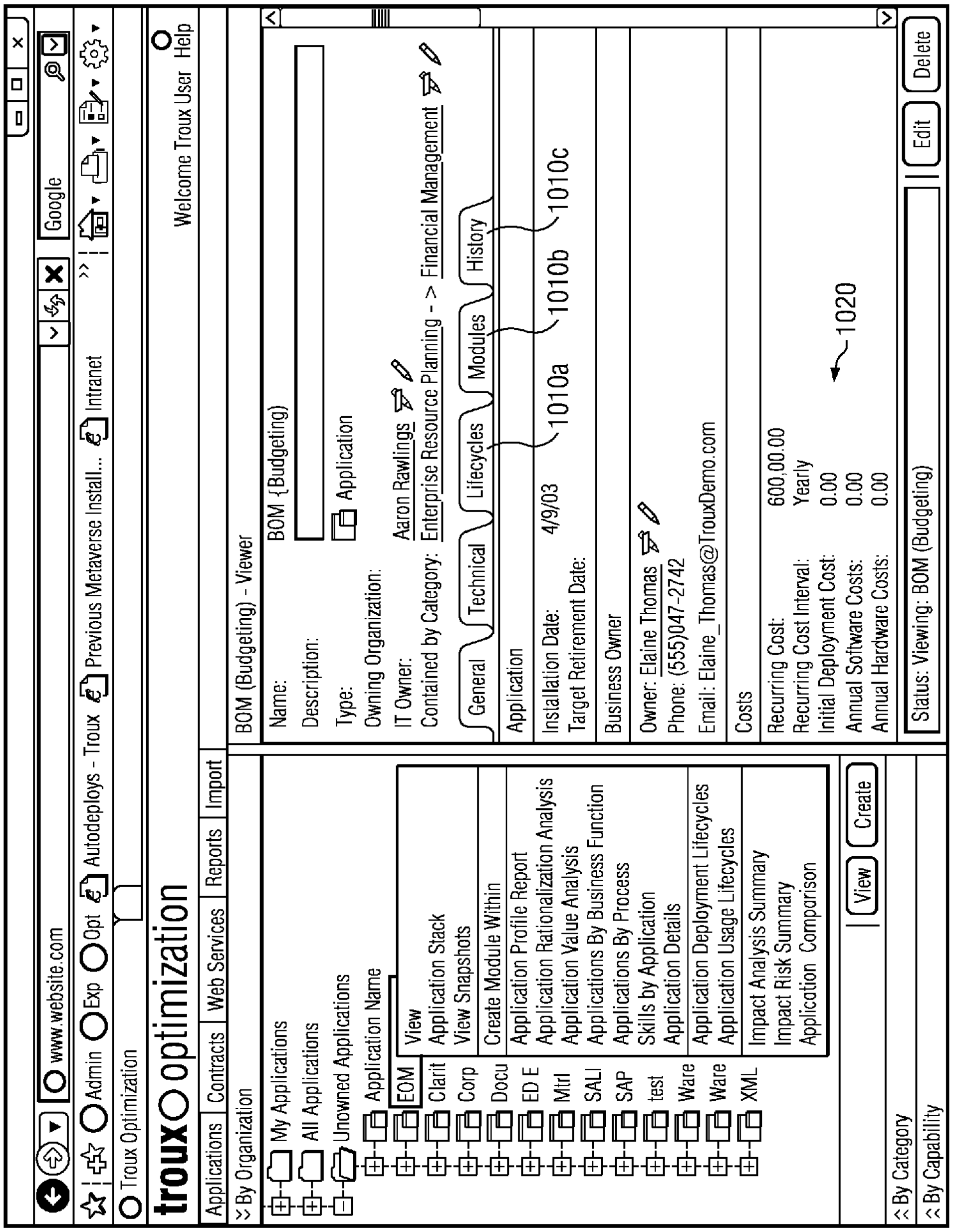
FIG. 9 includes one embodiment of an interface.

Now suppose a user accessing an applications manager system access the interface as defined by the XML files depicted in FIGS. 6-8. Suppose first that, with reference to FIG. 9, that that the user has been classified as a "level4" maturity level in association with the maturity sequence 'apo'. In this case the interface as depicted in FIG. 9 will be rendered in presented to the user. Notice that in this case the interface presented to the user comprises tabs labeled "Lifecycles," 1010*a* "Modules," 1010*b* and "History" 1010*c* and a section 1020 labeled "Costs." The "Lifecycles" tab 1010*a* is rendered according to the XML 910 in the XML file depicted above with respect to FIG. 8 while "Costs" section 1020 may be rendered according to the XML 710, 810 depicted above in FIG. 6 and FIG. 7. This "Lifecycles" tab 1010*a* and "Costs" section 1020 may be rendered because the user's maturity level for the 'apo' maturity sequence is higher than "level3".

Figure 10:
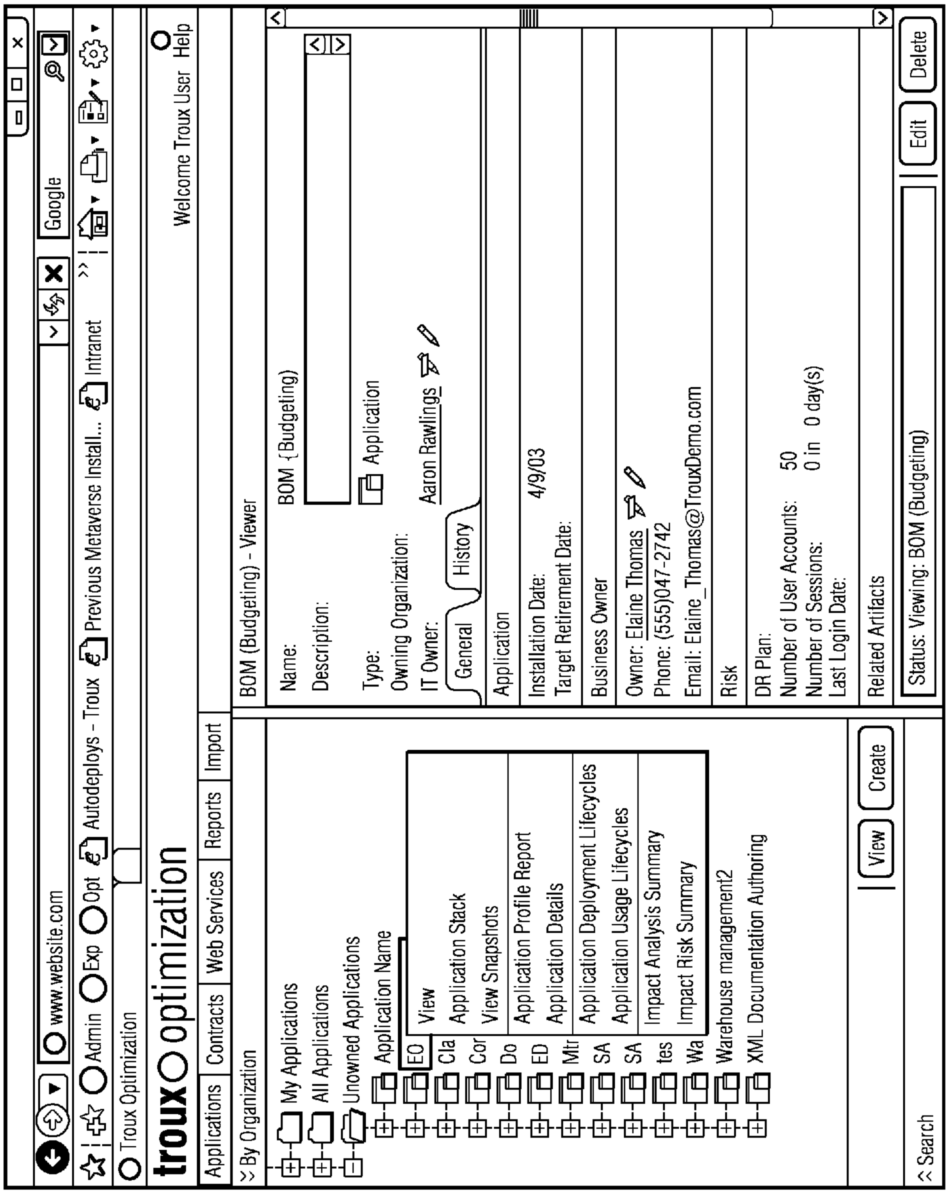
FIG. 10 includes one embodiment of an interface.

Now suppose that a second user has been classified as a "level1" maturity level in association with the maturity sequence 'apo' and this user accesses the interface as defined by the XML files depicted in FIGS. 6-8. In this case the embodiment of the interface as depicted in FIG. 10 will be rendered and presented to the user. Notice here that this embodiment of the interface does not comprise features such as the "Lifecycle" tab or a "Cost" section as depicted in FIG. 9. The "Lifecycles" tab and "Costs" section may not be rendered because the user's maturity level for the 'apo' maturity sequence is lower than "level3".

Other differences that result from the difference in maturity level of the different users may also be noticed. For example, left side accordion in FIG. 10 shows only "By Organization" and "Search" for maturity level "level1" but several additional navigation options are shown in FIG. 9 at maturity level "level4." Additionally, notice that the menu of actions for an object (for example "EOM (Budgeting)") includes many more entries in FIG. 9 at maturity level "level4." Moreover, the form used to view and modify an object in the right-hand pane of the interface includes more fields (for example "Contained by Category"), and whole groupings of fields (for example the "Lifecycles" tab, and the "Costs" group on the "General" tab) as shown in FIG. 9 at maturity level "level4."

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of tailoring the functionality of software by an application manager running on a processor, comprising:
- determining that a user is requesting access to a software application;
- determining a set of interfaces for accessing the software application, each interface comprising a form that defines the layout of a set of features;
- determining a set of maturity sequences associated with the software application;
- classifying the user into one of a set of maturity levels for each of the set of maturity sequences;
- determining the set of features of a first interface;
- determining a feature rule associated with each of the set of features of the first interface, wherein each feature rule comprises an expression associated with a maturity sequence and one maturity level of the set of maturity levels;
- for each feature of the set of features, determining if the feature should be included in the first interface based on the feature rule associated with the feature, the maturity sequence associated with the feature rule and the maturity level into which the user has been classified for the maturity sequence associated with the feature rule;
- assembling the first interface, wherein the first interface includes all of the set of features for which it is determined that the feature should be included in the interface; and
- presenting the first interface to the user.

2. The method of claim 1, wherein the set of maturity levels corresponds to a capability and maturity model.

3. The method of claim 1, wherein each of the set of interfaces comprises a set of XML files or data objects.

4. The method of claim 3, wherein the XML files defines the set of features for the interface and the feature rules associated with each of the set of features.

5. The method of claim 1, wherein the software application is an application manager.

6. The method of claim 1, wherein the user is classified into one of the set of maturity levels for each of the set of maturity sequences based on data associated with the user.

7. The method of claim 1, further comprising defining the feature rules for each of the features and the maturity sequences.

8. A system, comprising:
- an application management system, comprising:
- a processor; and
- a non-transitory computer readable medium, comprising instructions for:

determining that a user is requesting access to a software application;

determining a set of interfaces for accessing the software application, each interface comprising a form that defines the layout of a set of features;

determining a set of maturity sequences associated with the software application;

classifying the user into one of a set of maturity levels for each of the set of maturity sequences;

determining the set of features of a first interface;

determining a feature rule associated with each of the set of features of the first interface, wherein each feature rule comprises an expression associated with a maturity sequence and one maturity level of the set of maturity levels;

for each feature of the set of features, determining if the feature should be included in the first interface based on the feature rule associated with the feature, the maturity sequence associated with the feature rule and the maturity level into which the user has been classified for the maturity sequence associated with the feature rule;

assembling the first interface, wherein the first interface includes all of the set of features for which it is determined that the feature should be included in the interface; and presenting the first interface to the user.

9. The system of claim 8, wherein the set of maturity levels corresponds to a capability and maturity model.

10. The system of claim 8, wherein each of the set of interfaces comprises a set of XML files or data objects.

11. The system of claim 10, wherein the XML files defines the set of features for the interface and the feature rules associated with each of the set of features.

12. The system of claim 8, wherein the software application is an application manager.

13. The system of claim 8, wherein the user is classified into one of the set of maturity levels for each of the set of maturity sequences based on data associated with the user.

14. The system of claim 8, wherein the instructions are further for: defining the feature rules for each of the features and the maturity sequences.

15. A non-transitory computer readable medium comprising instructions executable by a processor for:

determining that a user is requesting access to a software application;

determining a set of interfaces for accessing the software application, each interface comprising a form that defines the layout of a set of features;

determining a set of maturity sequences associated with the software application;

classifying the user into one of a set of maturity levels for each of the set of maturity sequences;

determining the set of features of a first interface;

determining a feature rule associated with each of the set of features of the first interface, wherein each feature rule comprises an expression associated with a maturity sequence and one maturity level of the set of maturity levels;

for each feature of the set of features, determining if the feature should be included in the first interface based on the feature rule associated with the feature, the maturity sequence associated with the feature rule and the maturity level into which the user has been classified for the maturity sequence associated with the feature rule;

assembling the first interface, wherein the first interface includes all of the set of features for which it is determined that the feature should be included in the interface; and presenting the first interface to the user.

16. The computer readable medium of claim 15, wherein the set of maturity levels corresponds to a capability and maturity model.

17. The computer readable medium of claim 15, wherein each of the set of interfaces comprises a set of XML files or data objects.

18. The computer readable medium of claim 17, wherein the XML files defines the set of features for the interface and the feature rules associated with each of the set of features.

19. The computer readable medium of claim 15, wherein the software application is an application manager.

20. The computer readable medium of claim 15, wherein the user is classified into one of the set of maturity levels for each of the set of maturity sequences based on data associated with the user.

21. The computer readable medium of claim 15, further comprising defining the feature rules for each of the features and the maturity sequences.

* * * * *